(12) United States Patent  (10) Patent No.: US 9,152,277 B1
Beguin et al.  (45) Date of Patent: Oct. 6, 2015

(54) TOUCHABLE PROJECTION SURFACE SYSTEM

(75) Inventors: Julien G. Beguin, San Francisco, CA (US); Ilya D. Rosenberg, Mountain View, CA (US)

(73) Assignee: Amazon Technologies, Inc., Reno, NV (US)

( * ) Notice: Subject to any disclaimer, the term of this patent is extended or adjusted under 35 U.S.C. 154(b) by 897 days.

(21) Appl. No.: 12/827,139

(22) Filed: Jun. 30, 2010

(51) Int. Cl.
*G06F 3/045* (2006.01)
*G06F 3/044* (2006.01)
*G06F 3/041* (2006.01)

(52) U.S. Cl.
CPC ............ *G06F 3/044* (2013.01); *G06F 3/045* (2013.01); *G06F 3/0412* (2013.01)

(58) Field of Classification Search
None
See application file for complete search history.

(56) References Cited

U.S. PATENT DOCUMENTS

| | | | |
|---|---|---|---|
| 6,496,200 B1* | 12/2002 | Snibbe et al. | 715/701 |
| 7,432,917 B2* | 10/2008 | Wilson et al. | 345/175 |
| 2001/0013855 A1* | 8/2001 | Fricker et al. | 345/156 |
| 2002/0080123 A1* | 6/2002 | Kennedy et al. | 345/173 |
| 2004/0021643 A1* | 2/2004 | Hoshino et al. | 345/173 |
| 2004/0179001 A1* | 9/2004 | Morrison et al. | 345/179 |
| 2005/0168449 A1* | 8/2005 | Katayose | 345/173 |
| 2006/0007177 A1* | 1/2006 | McLintock | 345/173 |
| 2007/0063981 A1* | 3/2007 | Galyean et al. | 345/173 |
| 2007/0300182 A1* | 12/2007 | Bilow | 715/799 |
| 2008/0088593 A1* | 4/2008 | Smoot | 345/173 |
| 2008/0192017 A1* | 8/2008 | Hildebrandt et al. | 345/173 |
| 2008/0247128 A1* | 10/2008 | Khoo | 361/681 |
| 2008/0281851 A1* | 11/2008 | Izadi et al. | 707/102 |
| 2009/0079702 A1* | 3/2009 | Colley | 345/173 |
| 2009/0256817 A1* | 10/2009 | Perlin et al. | 345/174 |
| 2010/0097335 A1* | 4/2010 | Jung et al. | 345/173 |
| 2010/0192096 A1* | 7/2010 | Barrett | 715/811 |

* cited by examiner

*Primary Examiner* — Nicholas Lee
(74) *Attorney, Agent, or Firm* — Lee & Hayes, PLLC

(57) ABSTRACT

A touch sensor, a projection surface, and a projector are combined to form a touchable projection surface system. An image presented by the projector is modified at least partially in response to touches on the touchable projection surface assembly. Implements such as styli, rollers, brushes, and so forth, as well as body parts such as fingers, palms, feet, and so forth may impart touches. Responses to the imparted touches may vary at least partially in response to the different implements.

50 Claims, 9 Drawing Sheets

TOUCHABLE PROJECTION SURFACE SYSTEM

BACKGROUND

Just as people naturally touch and interact with objects in the physical world, users of computing devices desire ways to manipulate objects in the virtual world.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
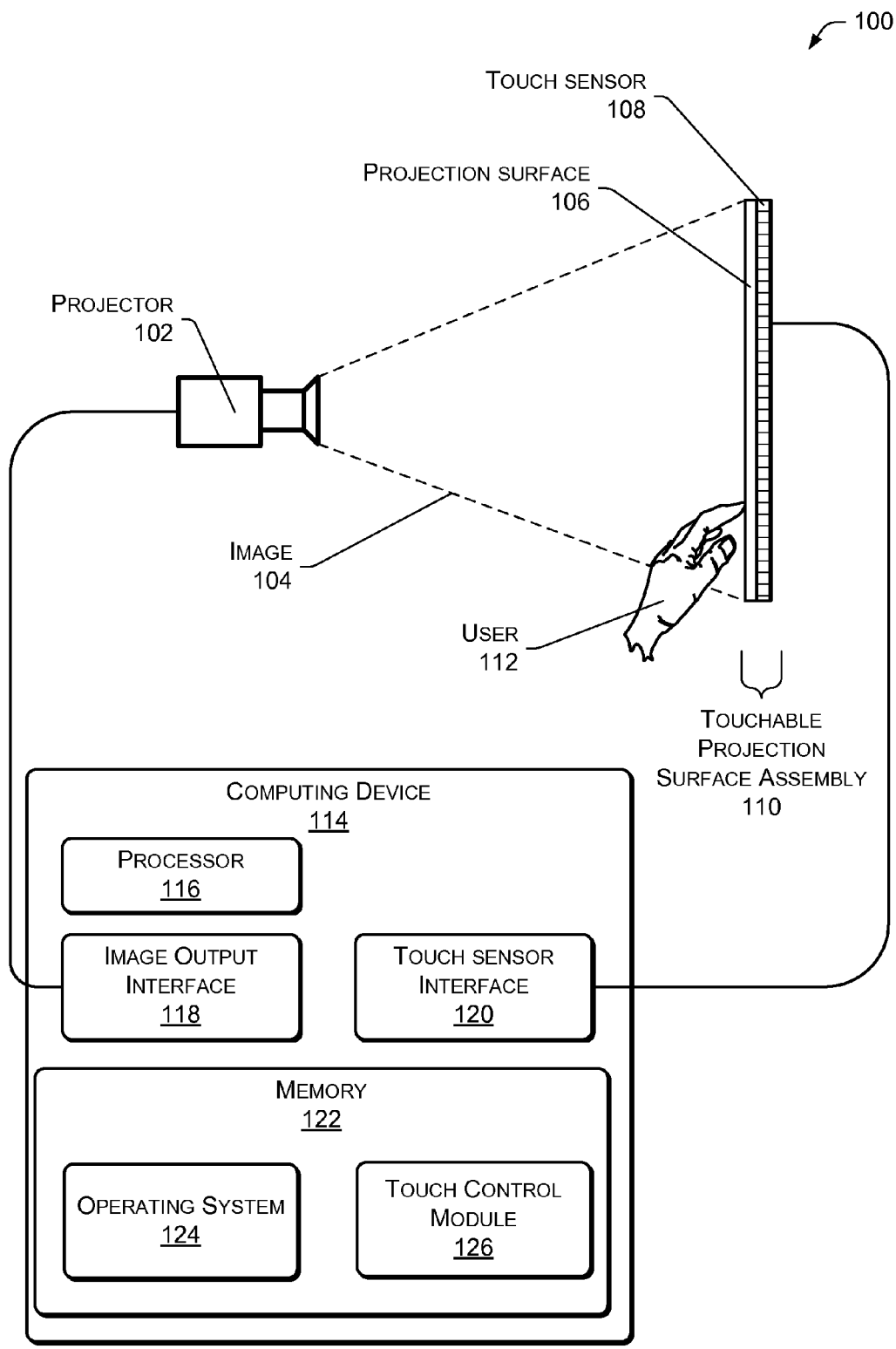
FIG. 1 shows an illustrative architecture for a touchable projection surface system.

As described above, users prefer to interact with virtual objects, both visually and through touch. Previously available technologies have been restricted to small form factors due to cost, weight, and system complexity. As a result, available large-format, touch-interactive devices have typically been limited to carefully constrained and high-cost environments.

This disclosure is directed towards a touchable projection surface system. The system is scalable in size from a portable device carried by a single user to a room-size implementation with interactive floors and walls. This system allows data presentation to the users via a projector onto a touchable projection surface assembly. The projector is configured to generate an image and may comprise a liquid crystal display projector, a liquid crystal on silicon (LCoS) projector, a laser projector, a laser scanning projector, microprojector, a digital micromirror device, and so forth.

The touchable projection surface assembly comprises a projection surface and a touch sensor. Thus, users may see an image projected on the projection surface, and interact with it via imparted touches detected by the touch sensor beneath. These touches include, but are not limited to, writing or drawing. The touch sensor may use a crosspoint array, such as a capacitive sensor, interpolating force-sensing resistance (IFSR) sensor, and so forth. In some implementations, the touch sensor is configured to provide a magnitude of force imparted as well as a location of the touch.

Output from the touch sensor, which includes the position and magnitude of one or more touches on the touch sensor, is provided to a processor. The processor may modify output at least partly in response to the output from the touch sensor. The output may comprise an image, sound, and so forth. For example, a user touching an image of a control may result in activation of the control. Additionally or alternatively, a user "drawing" on the projected image may result in the projection of the corresponding drawing onto the image and presentation of an audio prompt or sound.

In some configurations, the projector may be mounted at an angle of less than 45 degrees relative to a plane defined by the projection surface. Such an acute angle minimizes shadows in the projected image. In some implementations, multiple projectors may be configured to project the image or a portion of the image onto the projection surface.

In another configuration, the image may be projected from the rear of the projection surface. Rear projection prevents the user from casting a shadow upon the projection surface and obscuring the projected image. In such an implementation, the touch sensor may be transparent or translucent to allow the projected image to penetrate and reach the projection surface. In some implementations the touch sensor itself may be configured to act as a portion of the projection surface, in whole or in part.

The projection surface may also comprise a coating suitable for accepting markings from markers or other physical writing implements. For example, a user may write with a dry erase marker on the projection surface so configured. The touch sensor and processor may also be configured to accept input from different implements, and provide different actions in accordance with those implements. Implements may be distinguished by a pressure mapping, shape, external inputs such as a user designation of the implement, and so forth. Thus, a finger touch may invoke a particular action, such as presenting a menu, while a stylus touch may invoke a drawing of a line.

The touchable projection surface system allows surfaces including pads, desk tops, walls, floors, and so forth to become interactive. For instance, a touchable projection surface assembly may be disposed on a floor and accept the user's steps as input. For example, the touch sensor may determine the direction that a user is travelling. At least partly in response to this input, the projector may project an image whose content or projected placement on the projection surface is based on the user's location and/or direction of travel. For instance, the projector may project an image of information or directional prompts onto the floor in front of the user.

The touchable projection surface system may be deployed in form factors ranging from a single portable user device to multiple projector systems and one or more corresponding touchable projection surfaces on the walls and floors of a room. In one configuration, a microprojector may be used in conjunction with a portable touchable projection surface assembly. The portable touchable projection surface assembly may be tiled, foldable, rollable, and so forth allowing a compact configuration for storage, transport, and so forth.

While specific components and placements are described herein, it is noted that potentially other types of projectors, touch sensors, and so forth may be utilized to enable the projection of images and acquisition of user input. Accordingly, the discussion of specific implementations of the touchable projection surface system in this disclosure may equally apply to other implementations that may be used in conjunction with various electronic devices.

Illustrative Touchable Projection Surface System Architectures

FIG. 1 shows an illustrative architecture for a touchable projection surface system 100. A projector 102 is shown generating an image 104. In some implementations multiple cameras 102 may be used to cover larger areas, provide different projection modes, reduce shadowing, and so forth. The projector 102 may comprise a liquid crystal display projector, a liquid crystal on silicon (LCoS) projector, a laser projector, a laser scanning projector, microprojector, a digital micromirror device, and so forth. The image 104 may comprise color, black and white, still, video, or a combination thereof.

In some implementations other output may be present instead of, or in addition to, the projected image 104. For example, an audio output device (not shown) may be present and configured to provide or vary a sound at least partly in response to the one or more impinging touches.

The image 104 is projected onto a projection surface 106. The projection surface 106 is configured to provide a suitable surface for display of the projected image 104. The projection surface 106 may be white, gray, or other suitable lighter color. The projection surface 106 is also configured to provide a suitable surface for touch input and withstand wear and tear resulting from touches. In some implementations, the projection surface 106 may comprise a polymer such as polyethylene terephthalate (PET), glass fiber, and so forth.

As shown in this example, a touch sensor 108 is disposed adjacent to and behind the projection surface 106, such that the projection surface 106 is between the touch sensor 108 and the projector 102 during front projection operation. During front projection operation the image 104 is reflected from the projection surface to a user.

In some implementations, a portion of the touch sensor 108 may act as the projection surface 106. When affixed to one another, the projection surface 106 and touch sensor 108 form a touchable projection surface assembly 110. Lamination, mechanical engagement, adhesives, and so forth may affix the projection surface 106 and the touch sensor 108 to one another. The touchable projection surface assembly 110 may be planar, curved, or conformal to an underlying substrate such as a wall.

The touch sensor 108 may use a crosspoint array, such as a capacitive sensor, interpolating force-sensing resistance (IFSR) sensor, resistive array, and so forth. The IFSR sensor comprises at least two layers, each layer having a series of approximately parallel conductive traces or wires. These traces or wires may be printed, deposited, etched, embedded, or otherwise placed onto a substrate. In some implementations, the two layers are arranged such that the orientation of wires in a first layer is substantially perpendicular to the orientation of wires in a second layer. Upon application of an incident force to the layers, resistance to electrical current at and around the point of force application changes. By scanning the wires and measuring these changes in resistance at junctions of the wires, a location and magnitude of force applied may be determined.

In some implementations, the touch sensor 108 may be configured to sense objects proximate to, but not in contact with, the touch sensor 108. For example, a touch sensor utilizing projected capacitance sensor may detect the presence of a finger prior to the finger contacting the touch surface. This contactless sensing may be used to provide positioning data and pre-position a projected cursor near where the user's finger will touch down. Upon making contact with the surface, the contact-based touch data may then be utilized to determine the location of the user's finger.

In FIG. 1, the user 112 is shown touching the touchable projection surface assembly 110. When operational, a pressure imparted upon the touchable projection surface assembly 110, such as a touch by the user 112, generates an output. As illustrated, the projector 102 and the touchable projection surface assembly 110 are coupled to a computing device 114. The computing device 114 may comprise a processor 116, configured to execute instructions. An image output interface 118 couples to the projector 102 and provides data to the projector 102 for rendering as the image 104. In some implementations a plurality of image output interfaces 118 may be present, such as to support multiple projectors 102. A touch sensor interface 120 couples to the touch sensor 108 and outputs a touch signal that may be used by the processor 116 to initiate commands, alter presentation of the image 104, and so forth.

The computing device 114 also incorporates a memory 122. The memory 122 may include, but is not limited to, RAM, ROM, flash memory, or any other medium or memory technology able to store data for access by the processor 116. The memory 122 may be used to store any number of functional components that are executable on the processor 116, as well as data that are rendered by the projector 104. For example, the memory 122 may store an operating system 124 and a touch control module 126.

The touch control module 126 accepts output from the touch sensor interface 120, which ultimately results in generation of commands for use by the processor 116. For example, the user 112 may impart a touch upon the touch sensor 108. In response to the touch, electrical or optical characteristics of the touch sensor 108 vary. The touch sensor interface 120 converts these variations of electrical or optical characteristics into a stream of data. This stream of data may comprise information such as the location and magnitude of pressure applied to the touch sensor for given coordinates on the touch sensor.

A bus or wireless connection from the touch sensor interface 120 to the touch control module 126 transfers this stream of data. The touch control module 126 in turn processes this stream of data. The processing by the touch control module 126 may include recognizing characteristics of the touches, determining recognizing sequences of touches as gestures, and so forth.

In some implementations the touch control module 126 may generate commands from gestures, such as "open menu" or "draw line" and pass these along to the operating system 124 which then calls specific program functions in response to these commands. In other implementations the operating system 124 may accept the recognized characteristics or gestures and generate the commands. Where the commands call for a change in the presentation of the image 104, the operating system 124 initiates a command to the image output interface 118 which causes the projector 102 to alter output.

Figure 2:
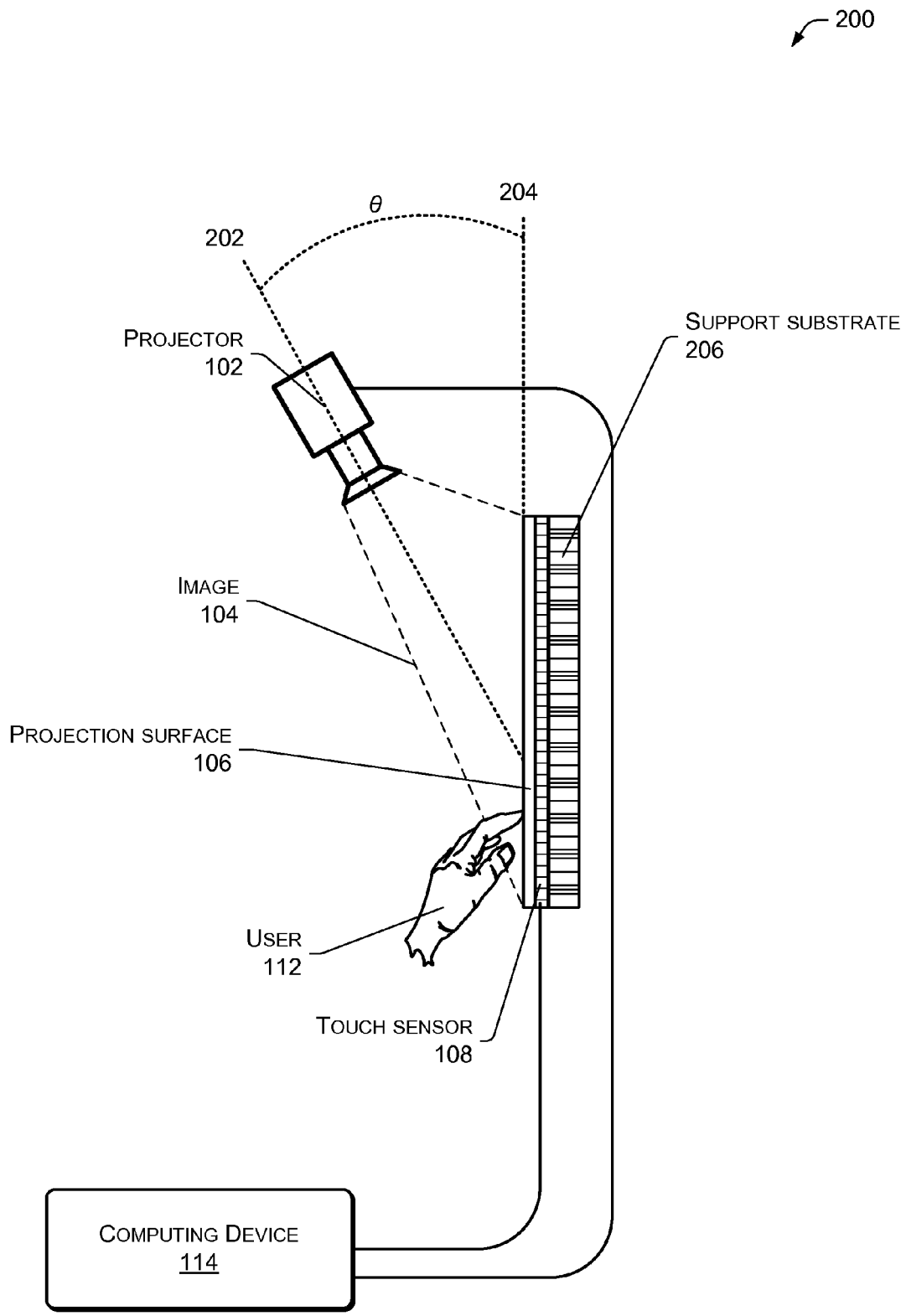
FIG. 2 shows an illustrative architecture for an acute angle front projection touchable projection surface system.

FIG. 2 shows an illustrative architecture for an acute angle front projection touchable projection surface system 200. In this illustration, the projector 102 is disposed at an angle θ, which is defined by a centerline 202 of the projector 102 and a line 204 parallel with a surface plane defined by the projection surface 106.

The acute angle θ minimizes shadows in the projected image. In some configurations, the angle θ may be less than or equal to about 45 degrees. Also, in some implementations multiple projectors may be used. These multiple projectors may be configured to project the same image 104, or a portion of the image 104, onto the projection surface 106 to mitigate shadows caused by one or more users interacting with the touchable projection surface assembly 110.

Figure 3:
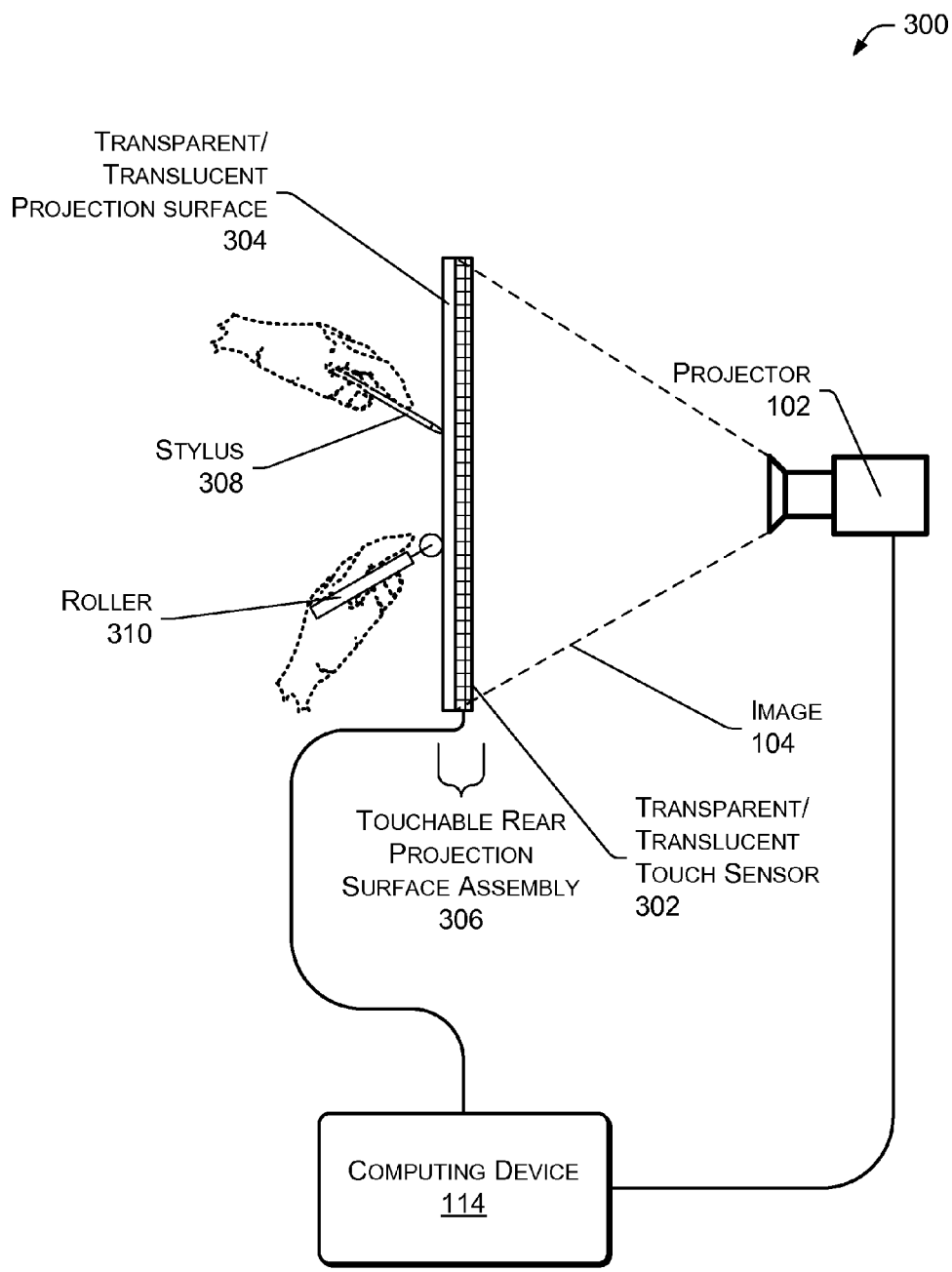
FIG. 3 shows an illustrative architecture for a rear projection touchable projection surface system, as well as the use of different implements to impart touches.

A support substrate 206 may be disposed behind the touchable projection surface assembly 110. The support substrate 206 may comprise a sheet of a rigid material. In some implementations the sheet of rigid material may be backed by an additional structure to improve rigidity, such as a honeycomb. As a result, the support substrate 206 may provide a rigid and yet lightweight support. The support structure 206 may be configured to allow coupling to adjacent touchable projection surface assemblies 110, allowing for tiling and increased overall size. In some instances, the support structure may comprise a wall. As such, in the illustrated example, the user 112 may have affixed the touchable projection surface assembly 110 to the wall for the purpose of interacting with projected images on the wall. 1. FIG. 3 shows an illustrative architecture for a rear projection touchable projection surface system 300. In this illustration, a transparent or translucent touch sensor 302 is disposed behind a transparent or translucent projection surface 304 to form a touchable rear projection surface assembly 306. The image 104 is thus transmitted through the projection surface to a user.

The image 104 from the projector 102 passes substantially through the transparent or translucent touch sensor 302 for presentation upon the transparent or translucent projection surface 304. In such an implementation, the transparent or translucent touch sensor 302 may be configured to act as at least a portion of the transparent or translucent projection surface 304.

Rear projection prevents the user from casting a shadow upon the projection surface and obscuring the projected image while operating on the image. For example, as shown here, because the field of view between the projector 102 and the transparent or translucent projection surface 304 is not obscured by the user's hands, body, implements, and so forth, the image 104 remains unobscured.

Also shown in this illustration is the use of different implements to impart touches, regardless of whether front or rear projection is used. The computing device 114 may be configured to distinguish between different implements, and initiate a particular actions based at least in part upon those different implements. For example, the touch control module 126 within the computing device 114 may be configured to draw a line when a stylus 308 produces a touch on the touch sensor, while a finger touch may open a user control menu. Implements may be distinguished via characteristics of their touch such as the shape and distribution of pressure, or via external cues such as radio frequency identification tags, optical recognition, magnetic fields, manual input or selection by the user 112, and so forth.

In addition to the stylus 308, other implements such as a roller 310, shaped tokens, and so forth may provide touches on the touch sensor. The image 104 presented on the projection surface may be modified at least partly in response to the touches. For example, the roller 310 may produce a wide band of a single color with a particular color, similar to that produced by a paint roller. In another example, a brush with bristles brushed against the touch sensor may produce a visual representation similar to that provided by a brush laden with paint touching a surface.

Figure 4:
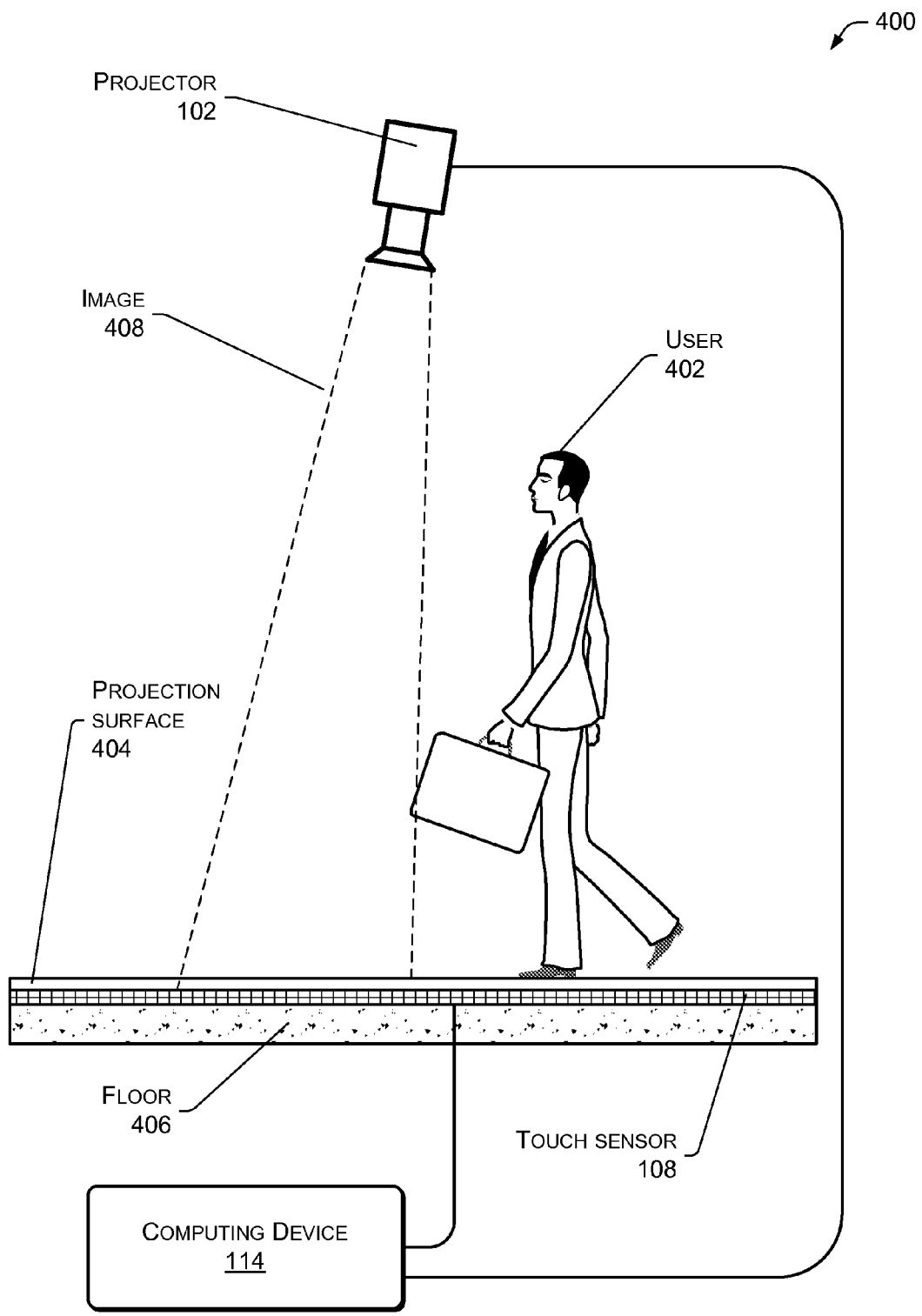
FIG. 4 shows an illustrative architecture for an interactive floor using an image projector and a touch sensor underfoot.

FIG. 4 shows an illustrative architecture for an interactive floor 400. With the advent of touch sensing technologies, such as IFSR, large scale touch sensors may be economically feasible. In this illustration, a user 402 is walking through a room, shown in cross section. The user 402 is walking along a floor covering configured to act as a projection surface 404. In this instance, the touch sensor 108 is disposed underneath the projection surface 404. Beneath the touch sensor 108, meanwhile, is the floor 406. In this illustration, the floor 406 is shown as a concrete slab, however the floor 406 may comprise wood, metal, or other metals. The projector 102 is mounted overhead or on a wall, and is configured to project an image 408 onto the projection surface 404. The touch sensor 108 and the projector 102 are coupled to the computing device 114, which may be located within or outside the room.

Figure 5:
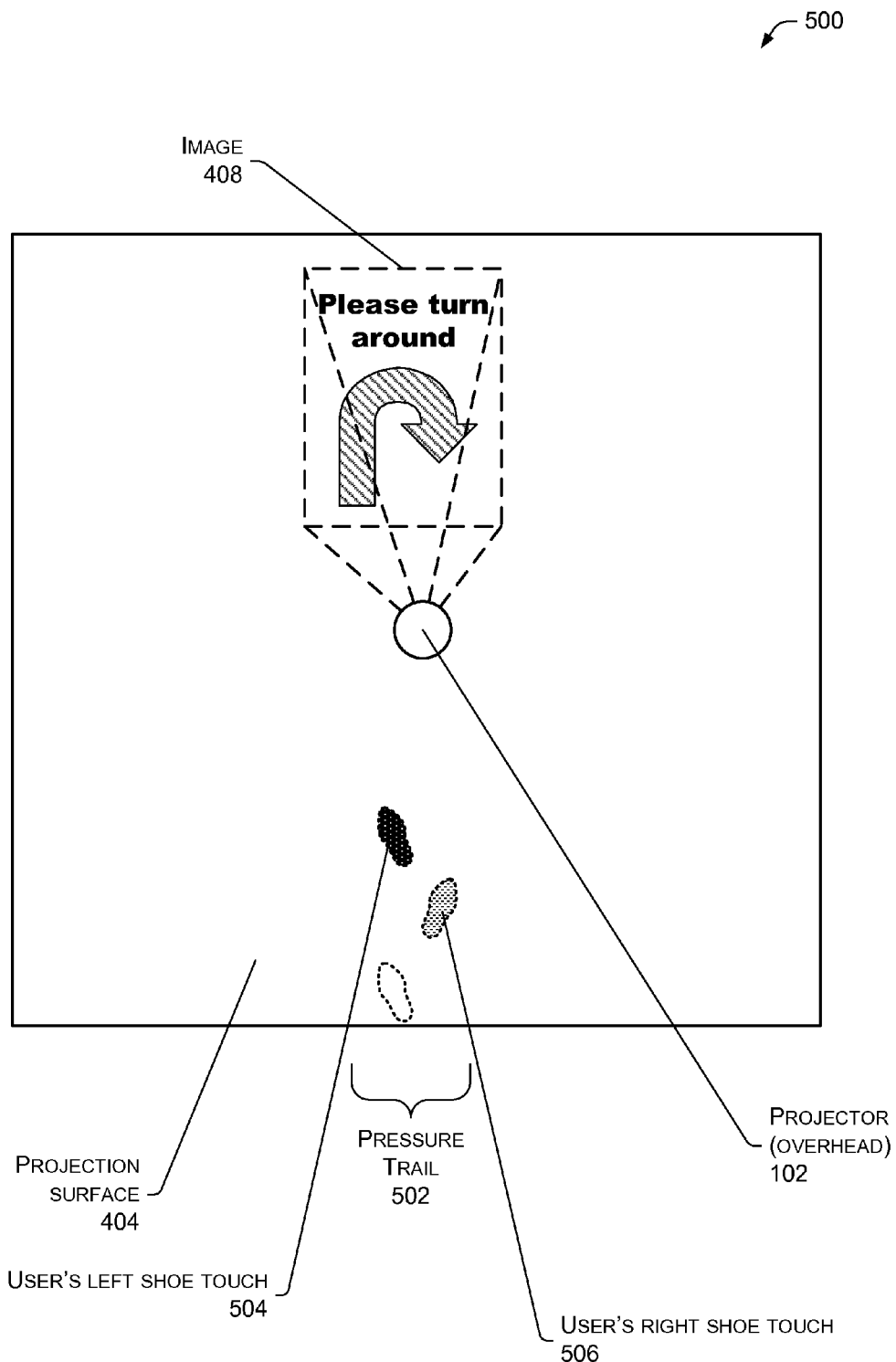
FIG. 5 shows an overhead view of the architecture of FIG. 4 showing a directional prompt projected by the image projector onto the projection surface flooring.

FIG. 5 shows an overhead view of the interactive floor 400 of FIG. 4. This illustration depicts a pressure trail 502 resulting from the feet of the user 402 walking on the projection surface 404 and, thus, pressing on the underlying touch sensor 108. Shown in the pressure trail are the distinct outlines of the shoes from the user's left shoe touch 504 and the user's right shoe touch 506. In some implementations, all or a portion of the user 402's pressure trail 502 may be projected onto the projection surface 404, while in other instances the pressure trail may simply be monitored by the computing device for altering a location or content of a projected image.

Given the distinguishable shape of the user's shoes 504 and 506, as well as the pressure tail 502, the computing device 114 may be configured to monitor the user 402 and provide directional, informational, or other prompts. For example, in this illustration the image 408 comprises a user prompt for the user 402 to "please turn around," along with an arrow indicating the proper direction of travel that the projector 102 is projecting onto the projection surface 404 underfoot. Such a visual prompt provides a simple and effective way to guide individuals in complicated environments, including hospitals, large office buildings, airports, and so forth. In some implementations, continuous prompts may be provided to give the user guidance in reaching their destination.

To aid in this continuous guidance, or for other purposes, the computing device 114 may be configured to recognize a particular user. The particular user may be recognized through analysis and comparison of one or more distinguishing factors. These distinguishing factors may include shape of shoes or feet, pressure distribution of the one or more shoes or feet, magnitude of total force, temporal characteristics associated with the particular user's gait, and so forth. The particular user may be recognized by using other sensors. For example, radio frequency identification (RFID) tags, facial recognition, voice recognition, and so forth may be used to distinguish the particular user.

Prompts or output provided to users may vary to correspond to the distinguishing factors. For example, weight of passengers or cargo may be used to direct the passengers or cargo to specific seats or locations on an aircraft to provide for proper center-of-mass balancing. In another example, shoe sizes below a pre-determined threshold may be associated with children, and corresponding non-textual prompts provided.

In other implementations, non-visual prompts may be provided instead of, or in addition to, the visual prompts described herein. For example, in some implementations audio prompts may be provided. These audio prompts may be provided either via a public address system, or via focused sound projection such as hypersonic sound. Hypersonic sound utilizes two or more ultrasonic emissions focused to a particular point and generate audible sound from interference between the beams. In other implementations, haptic or other physical feedback may be provided. For example, surface texture may be modified, vibration introduced to the location of the user, fog effects initiated, sprinklers triggered to dispense a fluid, and so forth.

Figure 6:
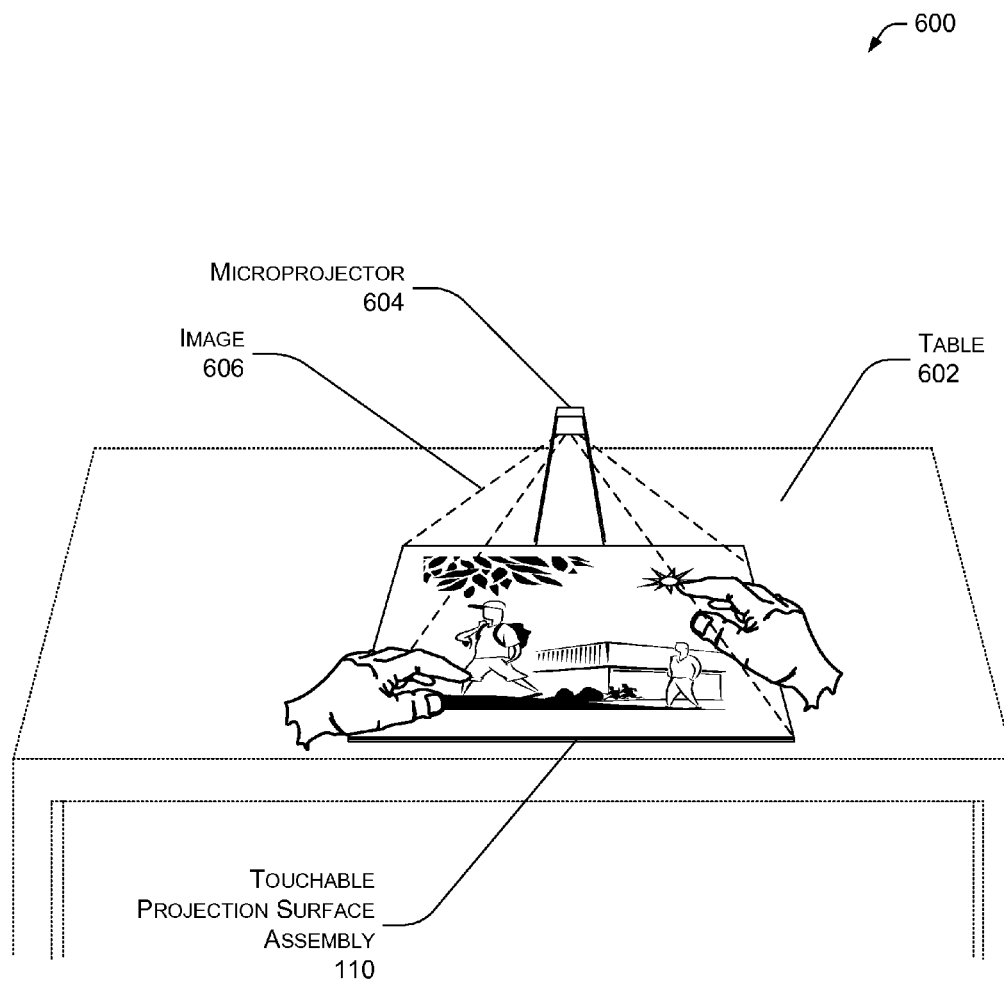
FIG. 6 shows a perspective view of a portable touchable projection surface system in use.
Figure 6:
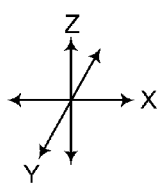

FIG. 6 shows a perspective view of a portable touchable projection surface system 600 in use. The touchable projection surface assembly 110 is scaleable, and may be used in smaller, portable applications such as shown here. In this instance, a microprojector 604 couples to the touchable projection surface assembly 110, which is positioned to cast an image 606 down onto the touchable projection surface assembly 110 located on a table 602. Similar to the projector 102 described above, the microprojector 604 projects the image 606, which the user may then modify at least partly in response to providing touches on the touchable projection surface assembly 110.

Figure 7:
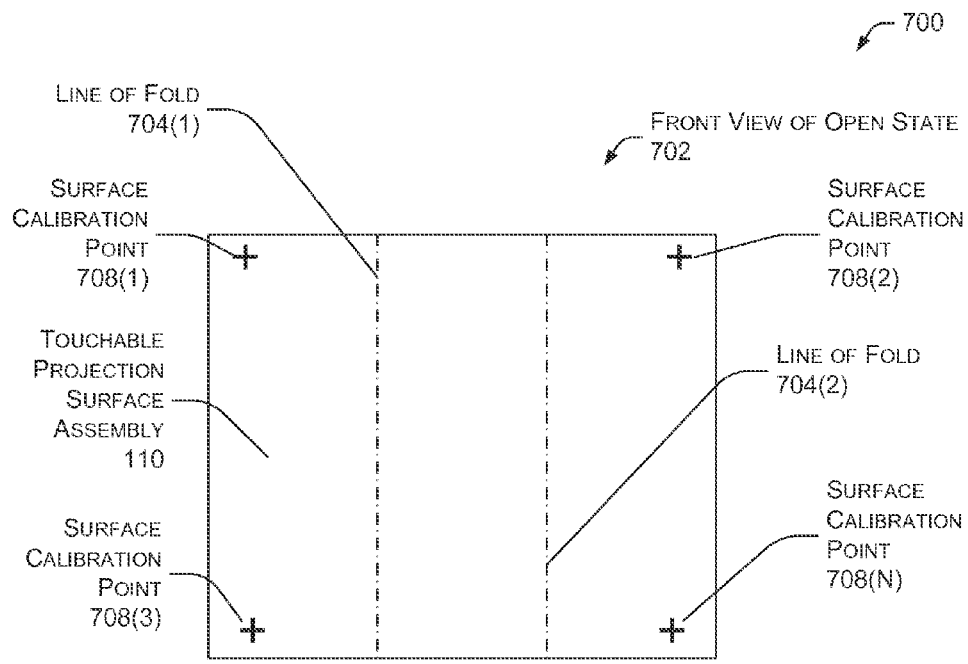
FIG. 7 shows the folding of the portable touchable projection surface assembly for storage or transport.
Figure 7:
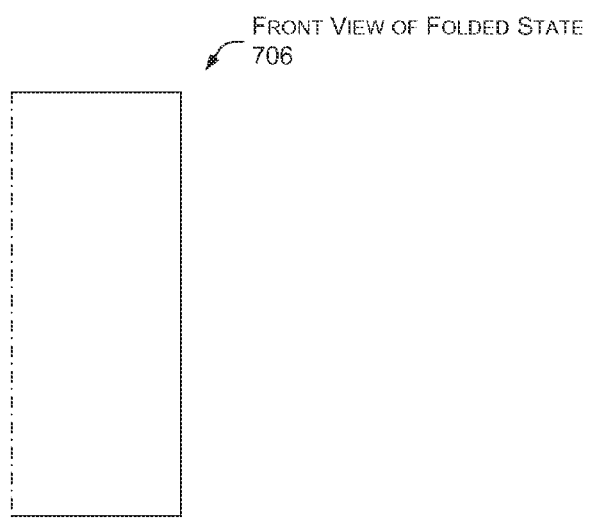

FIG. 7 shows the folding 700 of the portable touchable projection surface assembly configured for storage or transport. A front view depicts the touchable projection surface assembly 110 with two fold lines 704(1) and 704(2). The fold lines 704 arranged such that the touchable projection surface assembly 110 may be folded into thirds. The portable touchable projection surface assembly 110 comprises a plurality of surface calibration points 708(1), 708(2), 708(3), . . . , 708(N) disposed about the touchable projection surface assembly 110. In some implementations more or fewer folds 704 may be used. A front view of a folded state 706 shows the reduced footprint of the touchable projection surface assembly 110 after folding.

Larger touchable projection surface systems, such as those for a display booth, portable classroom, and so forth, may also be folded or disassembled into smaller components or tiles for ease of transport, storage, and so forth. Thus, larger environments allowing touch interaction with virtual objects may be easily relocated.

Illustrative Processes of Assembling and Using

Figure 8:
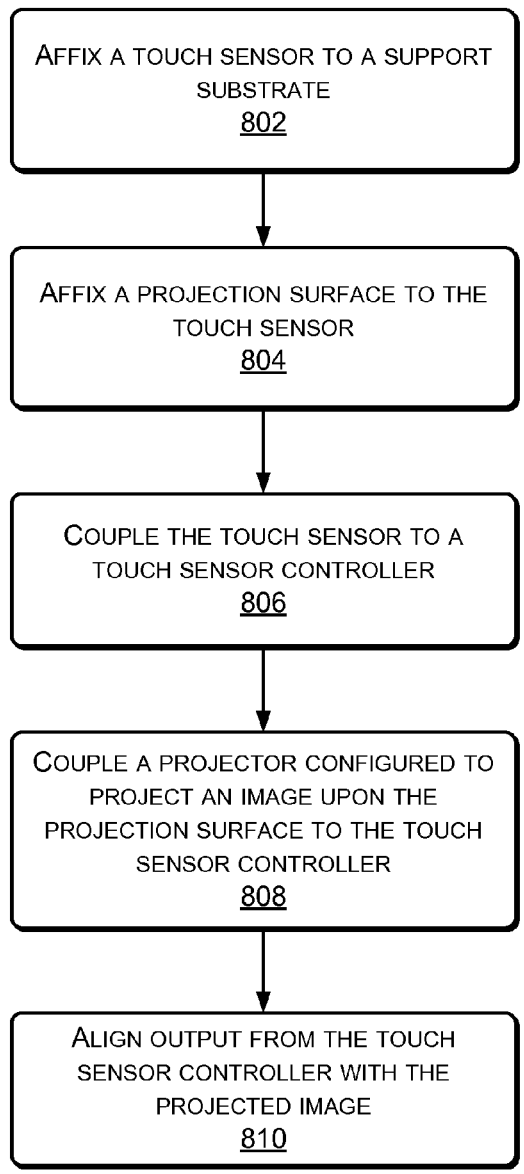
FIG. 8 is a flow diagram of a process for constructing a touchable projection surface system.
Figure 9:
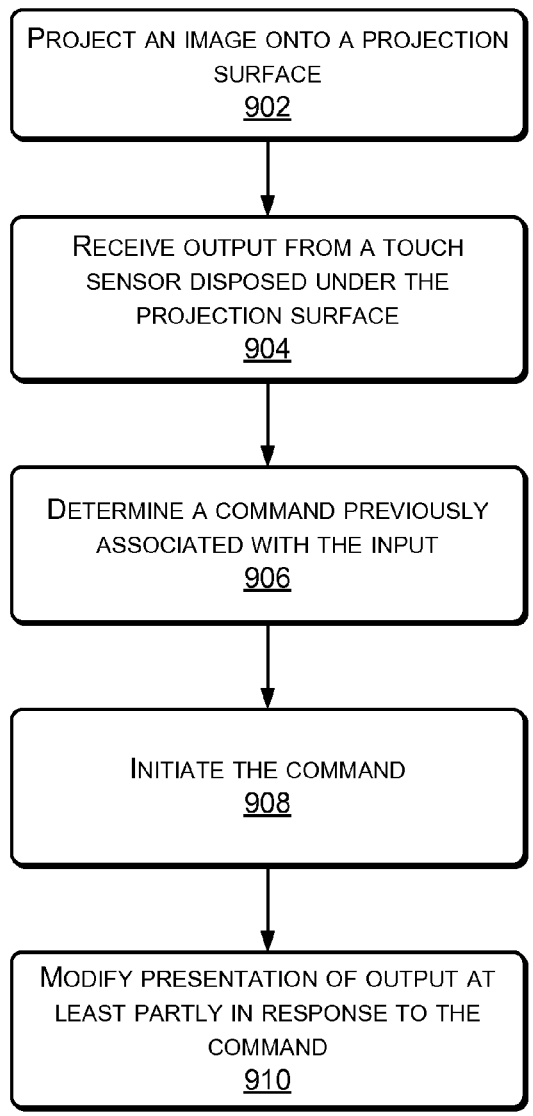
FIG. 9 is a flow diagram of a process for accepting touch sensor input and modifying presentation of a projected image at least partially in response.

FIGS. 8-9 illustrate example processes 800 and 900 that may be implemented by the architectures described above with respect to FIGS. 1-7, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other operating systems as well.

FIG. 8 is a flow diagram of a process 800 for constructing a touchable projection surface system. At 802, a touch sensor is affixed to a support substrate. The touch sensor and the support substrate may be laminated, attached to one another with adhesive, mechanically engaged, or otherwise joined to one another. In some implementations the touch sensor may comprise an IFSR. The substrate provides mechanical support, and may also provide pathways to couple at least a portion of the touch sensor to a touch sensor interface. In some implementations the substrate may comprise an active portion of the touch sensor.

At 804, a projection surface is affixed to the touch sensor on a side opposite that of the support substrate. As above, the projection surface and the touch sensor may be laminated, attached to one another with adhesive, mechanically engaged, or otherwise joined to one another. The projection surface is configured to present light incident from a projector as well as incident touches. In some implementations, the projection surface may also be configured to accept markings, such as with a dry erase marker.

At 806, the touch sensor is coupled to a touch sensor interface. Coupling establishes a pathway for the transmission of signals between the touch sensor and the touch sensor interface. In some implementations the coupling may be provided by electrical conductors such as wires, optical systems, and so forth. The touch sensor interface is configured to determine touches incident upon the touch sensor, and provide output with this information. The output in turn may be utilized by a touch control module to initiate specific actions after receiving a pre-determined input.

At 808, a projector configured to project an image upon the projection surface is coupled to the touch sensor controller. In some implementations, this coupling comprises an interchange of data via the operating system as described above with respect to FIG. 1. Also as described above, the projector is configured to generate an image and may comprise a liquid crystal display projector, a liquid crystal on silicon (LCoS) projector, a laser projector, a laser scanning projector, microprojector, a digital micromirror device, and so forth.

In some implementations, the touch sensor may be calibrated such that points within the touch sensor match corresponding points of the projected image. For example, a pixel at the very top-leftmost location corresponds to a touch at the very top-leftmost portion of the touch sensor.

At 810, output from the touch sensor controller is aligned with the projected image. This alignment or calibration may be manual or automatic. For example, an automatic alignment may sense targeting marks on the projection surface and adjust the presented image without user intervention. The sensing of the targeting marks may be accomplished via a camera, optical sensor, scanner, and so forth.

In one implementation, alignment may be accomplished by projecting an image containing calibration points. When the user applies pressure to the calibration points, the alignment may be computed.

In another implementation, the touchable projection surface assembly 110 may have previously affixed calibration points. The projected image 104 may then be adjusted such that calibration points within the image correspond to the previously affixed calibration points. The calibration points may be printed upon the projection surface 106, or be provided via lights such as light emitting diodes emplaced behind the projection surface 106 such that they are visible when active.

In still another implementation, a combination of the above alignment methods may be implemented. For example, the user may provide coarse alignment by adjusting the projected image and precision alignment by pressing on projected alignment points. FIG. 9 is a flow diagram of a process 900 for receiving touch sensor input and modifying presentation of a projected image at least partially in response. At 902, a projector projects an image onto a projection surface. This image may contain objects such as graphical user interface elements with which a user may interact within a virtual environment.

At 904, output from a touch sensor disposed under the projection surface is received. This output may include a location, shape, magnitude, movement, and so forth of one or more touches. For example, the output may comprise a data indicating a touch of a specified magnitude at specified coordinates upon the touch sensor.

At 906, a processor determines one or more commands previously associated with the input. As described above, the nature of the touch input may be associated with a particular command. Thus, finger touches may be associated with a first command while a stylus touch is associated with a second command. For example, a finger touch may be associated with a user menu of possible options available to the user while a stylus touch results in the drawing of a line.

At 908, the processor initiates a command at least partly in response to the input. For example, the processor proceeds to generate the user menu at least partly in response to the finger touch.

At 910, at least partly in response to the command, the projector modifies output. For example, the presentation of the image may be adjusted, an audio prompt played, and so forth. To continue the example, the user menu is presented in response to the finger touch via the projector and a sound played via an audio output device.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system, comprising:
    a computing device, comprising:
        a processor;
        an image output interface configured to provide data to a projector to project an image onto a projection surface, the projection surface including surface calibration points;
        a touch sensor interface coupled to a touch sensor coupled to the projection surface, the touch sensor interface configured to:
            detect one or more touches upon the touch sensor; and
            generate one or more touch signals at least partly in response to detecting the one or more touches; and
        a touch control module executable by the processor to:
            detect the surface calibration points on the projection surface; and
            adjust the projected image size to align one or more locations on the touch sensor to one or more of the surface calibration points on the projection surface.

2. The system of claim 1, wherein aligning the one or more touch signals with the image includes automatically sensing, using one or more cameras, the surface calibration points on the projection surface.

3. The system of claim 1, wherein aligning the one or more touch signals with the image includes corresponding input at a location on the touch sensor with one of the surface calibration points on the projection surface.

4. The system of claim 1, wherein the touch sensor comprises an interpolating force-sensing resistance sensor.

5. The system of claim 1, wherein the touch control module is further executable by the processor to: change, based at least in part on the one or more touch signals, a location on the projection surface of where at least a portion of the image is projected.

6. The system of claim 1, further comprising a front-projection projector arranged at an angle relative to a plane formed by the projection surface of less than or equal to about 45 degrees.

7. The system of claim 1, wherein the projection surface comprises a support substrate.

8. The system of claim 1, wherein the projection surface is configured to act as at least a portion of a floor.

9. The system of claim 1, wherein the touch control module is further executable by the processor to:
    recognize a particular user based at least in part on touch sensor input; and wherein the image comprises information directed to the particular user as determined by the touch sensor.

10. The system of claim 1, wherein the projector comprises one or more light sources and a digital micromirror device.

11. The system of claim 1, wherein the projection surface is configured to fold or separate into pieces.

12. A system comprising:
    a computing device, comprising:
        a processor;
        an image output interface configured to provide data to a projector to display an image that includes image calibration points;
        a touch sensor interface configured to receive data from a touch sensor of a projection surface, wherein the projection surface includes surface calibration points; and
        a touch control module executable by the processor to calibrate the touch sensor such that the surface calibration points on the projection surface correspond to the image calibration points within the image.

13. The system of claim 12, wherein the touch control module is further executable by the processor to determine one or more touches upon the touch sensor and modify output based at least in part on the one or more touches.

14. The system of claim 13, wherein the output comprises an image, audio, or both.

15. The system of claim 12, wherein the calibration points correspond to respective visual elements of the image.

16. The system of claim 12, wherein the projection surface comprises a portion of the touch sensor.

17. The system of claim 12, wherein the projection surface is disposed between a user and the touch sensor when configured for use.

18. The system of claim 12, wherein the touch sensor is configured to sense objects proximate but not in contact with a touch sensor surface.

19. The system of claim 12, wherein the projector is disposed in front of the projection surface such that the image is reflected from the projection surface to a user.

20. The system of claim 12, wherein the projector is disposed behind the projection surface such that the image is transmitted through the projection surface to a user.

21. The system of claim 12, wherein the projection surface is disposed between a user and the touch sensor when configured for use.

22. The system of claim 12, wherein the projector comprises a digital micromirror device, a laser, or both.

23. The system of claim 12, wherein the touch sensor is transparent or translucent.

24. The system of claim 23, wherein the projector projects the image to the projection surface through at least a portion of the touch sensor.

25. The system of claim 12, wherein the projection surface is configured to accept markings from a marker or other physical writing implement.

26. A method, comprising:
    receiving, at a touch sensor controller of a computing device, output indicating one or more impinging touches on a touch sensor corresponding to one or more image calibration points projected onto a projection surface by a projector, wherein the projection surface includes surface calibration points; and aligning, by the computing device, the image calibration points projected onto the projection surface with the surface calibration points.

27. The method of claim 26, further comprising providing or varying, from an audio output device of the computing device, a sound at least partly in response to the one or more impinging touches.

28. The method of claim 26, wherein the projection surface is affixed atop the touch sensor.

29. The method of claim 26, wherein the one or more impinging touches comprise writing or drawing.

30. The method of claim 26, wherein the touch sensor comprises an interpolating force sensitive resistor sensor.

31. The method of claim 26, wherein the aligning comprises modifying the image such that one or more image calibration points on the projection surface correspond to the one or more impinging touches.

32. The method of claim 26, wherein the aligning comprising creating a correspondence between the image calibration points on the projection surface with one or more locations on the touch sensor.

33. One or more non-transitory, computer-readable storage media storing instructions that, when executed by one or more processors, cause the one or more processors to perform acts comprising:
accepting output from a touch sensor indicating one or more locations on the touch sensor that have been touched;
aligning the one or more locations on the touch sensor with one or more calibration points within the image;
in response to a user movement across the touch sensor, receiving touch input corresponding to the user movement;
determining, based at least on the touch input corresponding to the user movement, one or more physical characteristics of the user; and
providing, based at least in part on a direction of travel, a prompt to the user.

34. The one or more non-transitory, computer-readable storage media of claim 33, wherein the prompt includes information related to the direction of travel.

35. The one or more non-transitory, computer-readable storage media of claim 33, wherein the direction of travel is determined based at least in part on detecting a pressure trail from one or two feet of the user.

36. The one or more non-transitory, computer-readable storage media of claim 33, further storing instructions that, when executed by the one or more processors, cause the one or more processors to perform an act comprising:
determining a command previously associated with the output from the touch sensor;
initiating the command; and
modifying the image at least partly in response to the command.

37. The system of claim 1, wherein at least one touch signal of the one or more touch signals are configured such that an attribute of the at least one touch signal corresponds to a particular implement used to generate the one or more touches upon the touch sensor.

38. The system of claim 37, wherein a shape of a portion of the particular implement that contacts the touch sensor at least partly distinguishes the particular implement from a different implement.

39. The system of claim 37, wherein a pressure distribution of a portion of the particular implement that contacts the touch sensor at least partly distinguishes the particular implement from a different implement.

40. The system of claim 37, wherein a radio frequency identification tab associated with the particular implement at least partly distinguishes the particular implement from a different implement.

41. The system of claim 37, wherein a characteristic magnetic field associated with the particular implement at least partly distinguishes the particular implement from a different implement.

42. The system of claim 13, wherein the processor is configured to distinguish an implement contacting the touch sensor based at least in part upon a pressure distribution of at least a portion of the implement that contacts the touch sensor.

43. The system of claim 13, wherein the processor is configured to distinguish an implement contacting the touch sensor based at least in part upon a shape of at least a portion of the implement that contacts the touch sensor.

44. The system of claim 13, wherein the processor is configured to distinguish an implement contacting the touch sensor based at least in part upon interrogation of a radio frequency identification tag of the implement.

45. The system of claim 13, wherein the processor is configured to distinguish an implement contacting the touch sensor based at least in part upon a characteristic magnetic field associated with the implement.

46. The method of claim 26, further comprising distinguishing the one or more impinging touches generated by a particular implement based at least in part upon a shape of at least a portion of the particular implement that contacts the touch sensor.

47. The method of claim 26, further comprising distinguishing the one or more impinging touches generated by different implements.

48. The one or more non-transitory, computer-readable storage media of claim 33, further storing instructions that, when executed by the one or more processors, cause the one or more processors to perform an act comprising determining a particular implement interacting with the touch sensor based at least in part upon one or more characteristics of the particular implement.

49. The one or more non-transitory, computer-readable storage media of claim 48, wherein the characteristics of the particular implement comprise:
a shape of a portion of the particular implement in contact with the touch sensor;
a pressure distribution of the portion of the particular implement in contact with the touch sensor;
a radio frequency identification tag associated with the particular implement; or
a characteristic magnetic field associated with the particular implement.

50. The one or more non-transitory, computer-readable storage media of claim 48, wherein a command previously associated with the output from the touch sensor is associated with the particular implement.

* * * * *